United States Patent
Fuccello

(10) Patent No.: US 8,122,237 B2
(45) Date of Patent: Feb. 21, 2012

(54) DEVICE AND METHOD FOR ADJUSTING A CONVERGED DEVICE HAVING BARCODE READING AND RFID FUNCTIONALITIES

(75) Inventor: James R. Fuccello, Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 872 days.

(21) Appl. No.: 11/951,906

(22) Filed: Dec. 6, 2007

(65) Prior Publication Data

US 2009/0150659 A1 Jun. 11, 2009

(51) Int. Cl.
*G06F 15/177* (2006.01)

(52) U.S. Cl. .................. 713/100; 235/462.01; 340/13.26

(58) Field of Classification Search .................. 713/100; 235/462.01; 340/13.26
See application file for complete search history.

(56) References Cited

U.S. PATENT DOCUMENTS

| | | | |
|---|---|---|---|
| 7,386,323 B2 * | 6/2008 | Chen et al. ................. | 455/556.1 |
| 2006/0026268 A1 * | 2/2006 | Sanda ........................... | 709/221 |
| 2008/0088602 A1 * | 4/2008 | Hotelling ...................... | 345/173 |
| 2009/0170532 A1 * | 7/2009 | Lee et al. .................... | 455/456.3 |

\* cited by examiner

Primary Examiner — Albert Wang

(57) ABSTRACT

A method adjusts a computing device. The method receives configuration data relating to at least two functionalities of the device. The method adjusts configurations of components of the device as a function of the configuration data so that the device performs as if a first functionality of the at least two functionalities is a primary functionality of the device. The components are at least partially capable of the at least two functionalities.

21 Claims, 2 Drawing Sheets

DEVICE AND METHOD FOR ADJUSTING A CONVERGED DEVICE HAVING BARCODE READING AND RFID FUNCTIONALITIES

FIELD OF THE INVENTION

The present invention relates generally to a device and method for tailoring a converged device. Specifically, the converged device determines component configurations so that the converged device executes a specific functionality substantially similar to a dedicated device.

BACKGROUND

A mobile unit (MU) may include a variety of different functionalities. The MU may be specialized to perform specific functionalities (e.g., dedicated device). For example, the MU may be a radio frequency identification (RFID) device. The MU may allocate all available resources to the RFID functionalities. Consequently, the MU may not include any additional functionalities. The MU may also be a converged device. The converged device incorporates the multiple functionalities available on the MU. Thus, when a user requires an image to be captured, the MU operates as a camera; when a user requires to make a phone call the MU operates as a phone; etc. That is, the converged device is an MU that suits a user's technology need at each instance. However, because the converged device provides multiple functionalities, the converged device does not perform a specific functionality as well as a dedicated device tailored to the specific functionality.

SUMMARY OF THE INVENTION

The present invention relates to a method for adjusting a computing device. The method receives configuration data relating to at: least two functionalities of the device. The method adjusts configurations of components of the device as a function of the configuration data so that the device performs as if a first functionality of the at least two functionalities is a primary functionality of the device. The components are at least partially capable of the at least two functionalities.

DETAILED DESCRIPTION

Figure 1:
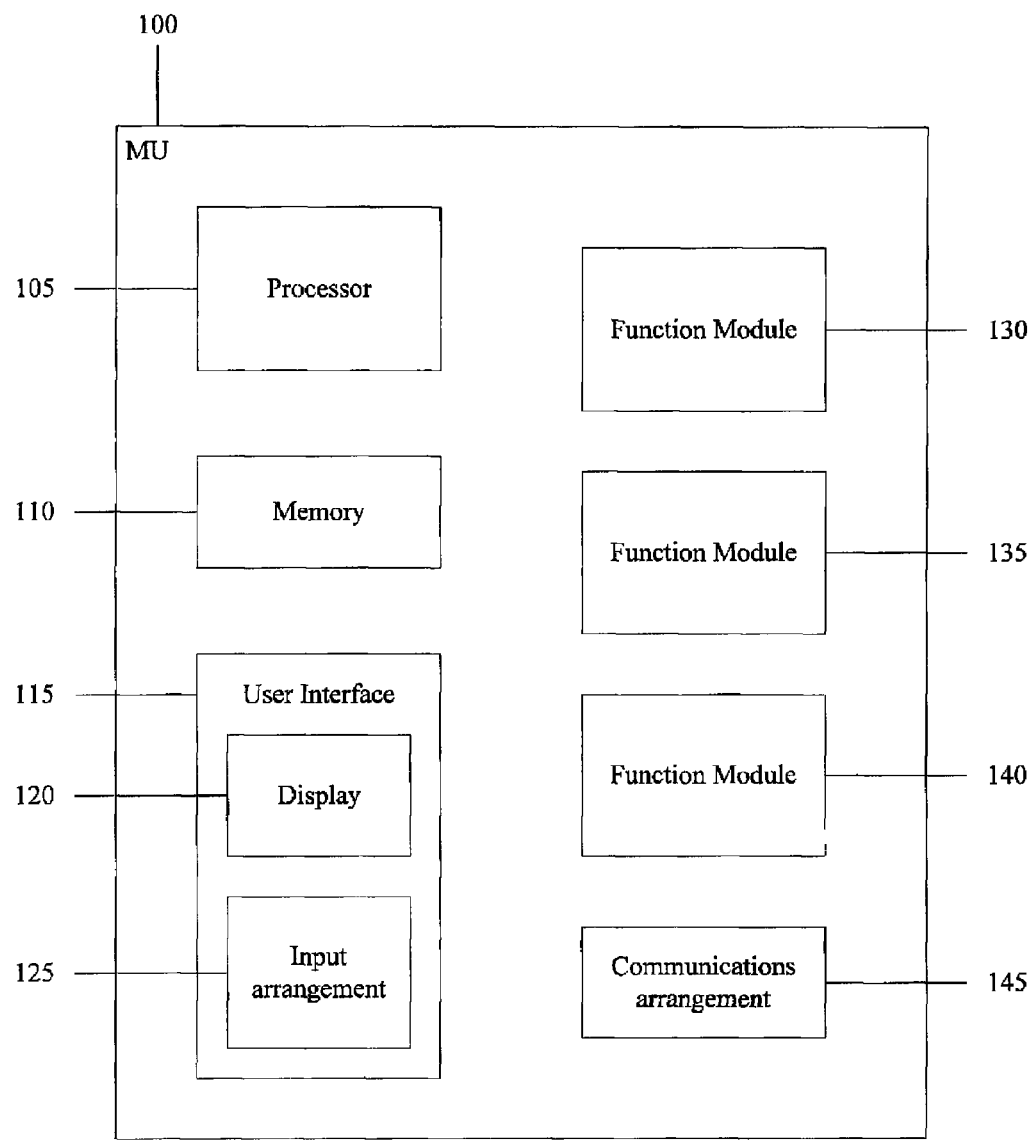
FIG. 1 shows an exemplary converged device according to an exemplary embodiment of the present invention.

The exemplary embodiments of the present invention may be further understood with reference to the following description and the appended drawings, wherein like elements are referred to with the same reference numerals. The exemplary embodiments of the present invention describe a device and method for tailoring a converged device. Specifically, the converged device of the exemplary embodiments of the present invention may include at least two functionalities and respective components that enable execution of these functionalities. As will be discussed in detail below, the at least two functionalities may be adjusted so that a user has a customized device that executes one functionality with higher operating parameters similar to a dedicated device that performs the one functionality. That is, the device may perform as if the one functionality is a primary functionality of the device such as with the dedicated device. The converged device, the functionalities, and the tailoring will be discussed in more detail below.

FIG. 1 shows an exemplary converged device according to an exemplary embodiment of the present invention. Specifically, the converged device may be a mobile unit (MU) 100. The MU 100 may be any portable electronic device that utilizes a portable power supply (e.g., battery, capacitor, super capacitor, etc.). The MU 100 may be, for example, a handheld terminal, a laptop, a pager, a wireless communication phone, a scanner, an radio frequency identification reading (RFID) device, a multimedia device, etc. It should be noted that the use of the MU 100 is only exemplary. That is, the exemplary embodiments of the present invention may apply to any electronic device (e.g., mobile or non-mobile) that is capable of executing more than one functionality. The MU 100 may include a processor 105, a memory 110, a user interface 115, function modules 130-140, and a communications arrangement 145.

The processor 105 may be a central computing component that operates the MU 100. The memory 150 may store data related to the MU 100. The data may pertain to programs installed on the MU 100, functionalities associated with the MU 100, etc. In addition, as will be discussed below, the data may also include configuration data relating to the functionalities of the MU 100. It should be noted that if the MU 100 is capable of connecting, via wired and/or wireless connections, to a network/infrastructure (e.g., LAN, WAN, VLAN, etc.), the configuration data may be stored on a database of a server.

The user interface 115 may comprise of any component(s) that enables a user to enter inputs, view data, etc. For example, the user interface 115 may include a display 120 and an input arrangement 125. The display 120 and the input arrangement 125 may be disposed at least partially on a housing of the MU 100. The display 120 may be a graphical user interface (GUI). The input arrangement 125 may be a keypad in which a user may enter various inputs or any other arrangement capable of obtaining/receiving data. The inputs may correspond to at least one installed program or functionality of the MU 100. It should be noted that the display 120 may be a touch screen that enables a user to enter inputs thereon. That is, the data input arrangement 125 being a separate component is only exemplary. Thus, the MU 100 may include the display 120 and the data input arrangement 125, the display 120 with touch screen capabilities, or a combination thereof. It should also be noted that the data input arrangement 125 may include further keypads disposed on other peripheral areas of the housing 105 such as a side data input arrangement.

The user interface 115 may enable a user to enter configuration data relating to the functionalities of the MU 100. As will be discussed in detail below, the configuration data may indicate a performance of the components of the MU 100 so that the functionalities operate at predetermined parameters. It should be noted that a manual entering of the configuration data is only exemplary. As will be discussed in detail below, the configuration data may be determined automatically by the processor 105.

The function modules 130-140 may be a component of the MU 100 responsible for a functionality of the MU 100. For example, the function module 130 may be a scanning engine. The scanning engine may be used to capture data encoded, for example, as a barcode (e.g., one-dimensional, two-dimensional, color, etc.). In another example, the function module 135 may be an RFID reader. The RFID reader may be used to capture data of an RFID tag. Thus, the module 135 may also be equipped with an RFID antenna. In yet another example, the function module 140 may be a camera. The camera may be used to capture an image by converting received light. It should be noted that the use of the function modules 130-140 is only exemplary. That is, the MU 100 may include fewer or more than three function modules. Furthermore, other types of function modules exist to increase a variety of functionalities executable by the MU 100. It should be noted that the functionalities performed by the function modules 130-140 may not correspond to the functionalities executable by the converged device. That is, the function modules 130-140 may be used as a portion of the functionality executed by the MU 100. For example, the MU 100 may include a tagging functionality. Thus, when the function module 130 is an RFID reader and the function module 140 is a camera, an RFID tag may be read and an image of an object in which the RFID tag is disposed may be taken. The RFID and the image may subsequently be associated (i.e., tagged).

The communications arrangement 145 may be a substantially similar component to the function modules 130-140. Specifically, the Communications arrangement 145 may be responsible for communication functionalities that are executable by the MU 100. For example, the communications arrangement 145 may include a transceiver. The transceiver may transmit and receive radio signals through an antenna coupled to thereto. The transceiver may allow the MU 100 to connect to a network/infrastructure. The communications arrangement 145 may also include voice components such as a speaker and a microphone. Voice inputs received through the microphone may be transmitted through the network to an intended party. Voice outputs may be played by the speaker upon receiving the voice output data through the transceiver. It should be noted that the communications arrangement 145 may enable a remote entering of the configuration data. That is, using the user interface 115 to manually enter the configuration data locally is only exemplary and a remote, manual entering of the configuration data is also enabled.

Figure 2:
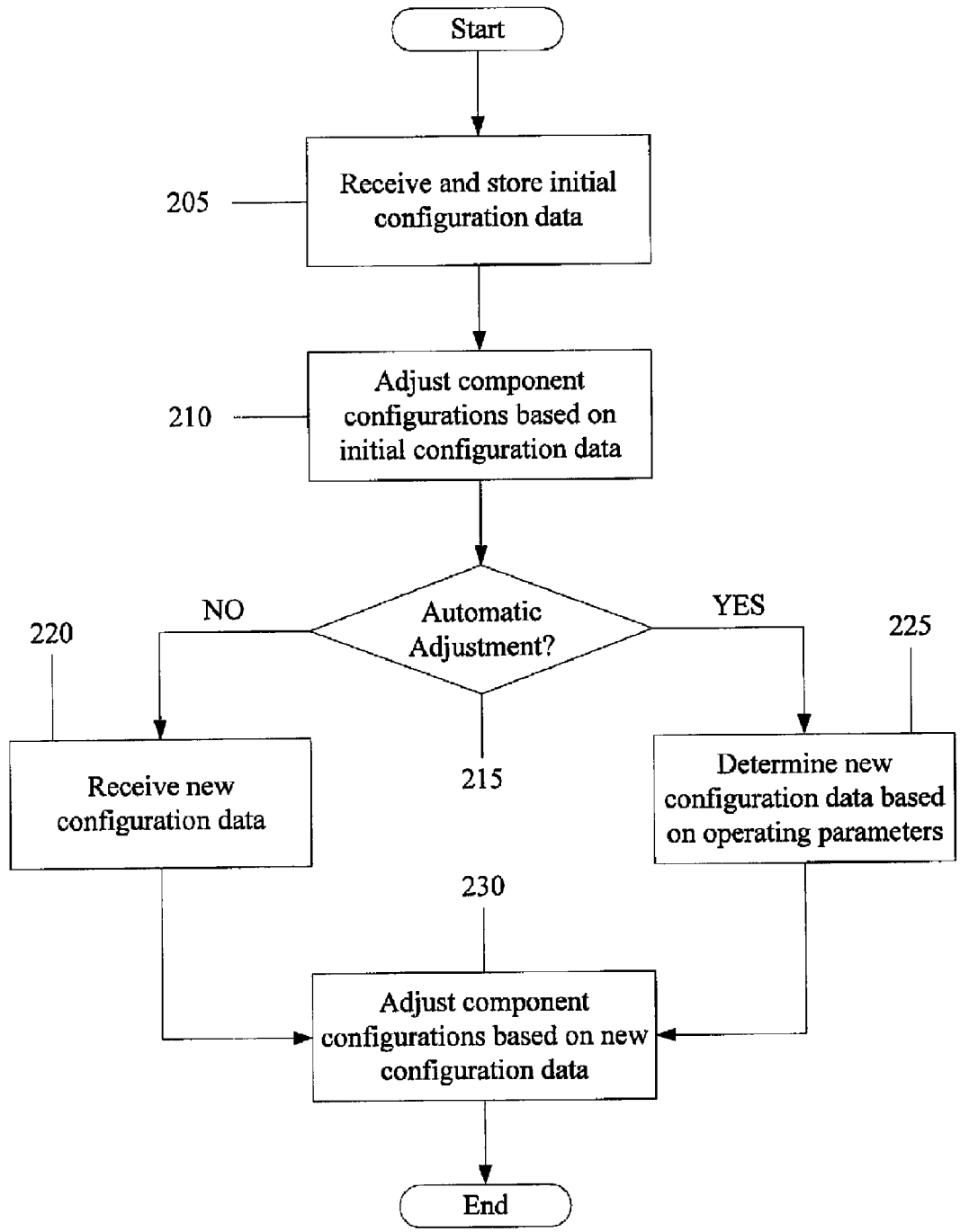
FIG. 2 shows an exemplary method for tailoring a converged device according to an exemplary embodiment of the present invention.

FIG. 2 Shows an exemplary method 200 for tailoring a converged device according to an exemplary embodiment of the present invention. Specifically, the method 200 configures a converged device such as the MU 100 to favor a particular functionality above other functionalities. The method 200 will be described with reference to the MU 100 of FIG. 1. It should again be noted that the use of the MU 100 is only exemplary. That is, the method 200 may apply to any electronic device that is capable of executing multiple functionalities.

In step 205, initial configuration data is received and stored on the MU 100. The initial configuration data may include drivers to set settings, operational parameters, etc. relating to each functionality executable by the MU 100. Step 205 may represent an initial configuring of the MU 100. The initial configuring may be done at various stages. Furthermore, the initial configuring may be done multiple times during the various stages. For example, during manufacture and prior to release for use or sale, the MU 100 may receive and store the initial configuration data. In another example, the memory 110 may not include any initial configuration data (i.e., no data is pre-stored on the MU 100 during manufacture). The converged device may receive the initial configuration data upon connecting to a network/infrastructure. In yet another example, the initial configuration data may be stored as a bundle so that when the MU 100 is activated, replies to prompts may install appropriate sections of the initial configuration data bundle. In further examples, the initial configuration data may be determined by measuring a position of the MU (e.g., camera pointed forward) or adaptive learning (e.g., frequency of use of a given functionality as a function of time).

In step 210, configurations relating to the components of the MU 100 are adjusted based on the initial configuration data. As discussed above, the initial configuration data may include drivers. The drivers may dictate a manner in which the components of the MU 100 are to operate, in particular with relation to other components. The initial configuration data may indicate that one functionality is to take precedence over other functionalities. That is, the one functionality may be, for example, used more intensively (e.g., often) than the other functionalities. For example, it may be predetermined that the one functionality such as RFID reading is a primary use for the MU 199 while image capturing (e.g., camera) is a secondary use. The RFID reading functionality may be adjusted to take precedence so that all necessary resources may be allocated thereto while the image capturing functionality may only be allocated a portion of a remainder of the resources. The predetermination may be made at various times. For example, the predetermination may be indicated to a manufacturer so that the initial configuration data may be used to adjust the MU 100. In another example, the MU 100 may be received with basic settings that equally allocate resources to each functionality. Subsequently, the initial configuration data may be used to adjust the functionalities.

In step 215, a determination is made whether an automatic adjustment of the configurations of the functionalities is performed. That is, the MU 100 may be adjusted manually or automatically. The adjustment performed at this stage of the method 200 may be to tailor the MU 100 specifically for the user. For example, the MU 100 may have been originally designed to primarily execute a first functionality (e.g., RFID reading). Subsequently, the user may require a second functionality (e.g., image capture) to be used primarily. This adjustment may reallocate resources so that the MU 100 may become better suited to execute the second functionality. In another example, the MU 100 may be configured to primarily execute a specific functionality. However, the resource allocation within the specific functionality may not be optimally suited. For example, with RFID reading, the MU 100 may allocate more resources to the RFID antenna than a transceiver that transmits the data from the RFID tag. However, the transceiver may be more important than the antenna. Thus, this adjustment may re-prioritize the resources within the specific functionality.

If step 215 determines that no automatic adjustment is performed, the method 200 continues to step 220. That is, the method 200 continues to step 220 when a manual adjustment of the configurations is performed. The manual adjustment may be performed through a configuration mechanism. The configuration mechanism may be accessed through the driver files. For example, a software application programming interface (API) may be used to access the configuration mechanism. In another example, a static manufacturing configuration may be used. In yet another example, a user interface (e.g., local through input arrangement 125 or remotely through communications arrangement 145) may be used. Further examples may include measuring a position of the MU (e.g., camera pointed forward) or adaptive learning (e.g., frequency of use of a given functionality as a function of time). Using any one or a combination of these methods, the user may enter new configuration data that adjusts the initial configuration data.

If step 215 determines that an automatic adjustment is performed, the method 200 continues to step 225. In step 225, new configuration data is determined based on operating parameters of the functionalities. The operating parameters may include, for example, resource usage. In a first exemplary embodiment, the operating parameters may be collected after each use of a functionality. In a second embodiment, the operating parameters may be collected dynamically so that the new configuration data is immediately available. In a third embodiment, the operating parameters may be collected at a time interval. The time interval may be, for example, after a use of a functionality, at predetermined time periods (e.g., after an hour, a day, a week, a month, etc.), at an initiation of the MU 100, a combination thereof, etc. Using any one or a combination of the methods described above, the new configuration data may be determined.

Whether the new configuration data was manually entered, automatically determined, or a combination thereof, the method 200 continues to step 230. In step 230, the component configurations are adjusted based on the new configuration data. The new configuration data may indicate that a particular functionality is favored over other functionalities. In particular, the new configuration data may adjust the initial configuration data. It should be noted that the new configuration data may override the initial configuration data. The adjustment of the components based on the new configuration data may alter an operation of one or more components. For example, resources allocated to the favored functionality may increase while the other functionalities are only allocated a portion of remaining resources. In another example, the communications arrangement 145 may be integrally linked to two or more functionalities. The new configuration data may indicate that the communications arrangement 145 is to be more available to the favored functionality than the other functionalities. The same may apply to other components such as the processor 105, the memory 110, system timing/interrupts, the user interface 115, etc.

In a specific example of the method 200, the MU 100 may support bar code scanning, voice and data communications via WLAN, WPAN, or WAN, and a camera. It may be determined that the MU 100 performs barcode scanner-intensive tasks with 802.11 communications being transmitted to a server. The voice communications (e.g., phone) may only be used occasionally. In this example, the MU 100 may be configured to provide maximum performance and usability to barcode scanning and 802.11 data transfer. That is, these functionalities may be performed by the MU 100 in a substantially similar manner to a dedicated terminal performing either of these functionalities. The voice communications performance may be lower such as being less user friendly (e.g., basic views on the display 120, basic keys for the input arrangement 125, etc.). The other functionalities may be adjusted in a substantially similar manner.

It should be noted that the method 200 may include additional steps. The method 200 may also be iterative. That is, after step 230, the method 200 may return to step 215 so that the converged device may be constantly adjusted. When the method 200 iterates, the new configuration data from a first run may become old configuration data. Thus, new configuration data of a second run may adjust or replace the old configuration data.

The exemplary embodiments of the present invention enable the operation of a converged device (e.g., MU 100) to be tailored so that at least one functionality operates substantially similar to a non-converged device (i.e., dedicated device). Available resources may be allocated to the at least one functionality for the tailoring. For example, a converged device may be used primarily as a phone and a location system (e.g., GPS). Network functionalities, scanning functionalities, data capture functionalities, etc. may also be included in the converged device but are only infrequently used. Thus, according to the exemplary embodiments of the present invention, the infrequently used functionalities may be powered off. Consequently, resources that are usually allocated to the infrequently used functionalities are re-allocated to the frequently used functionalities (e.g., phone, location system). Therefore, the frequently used functionalities may be used with no degradation in performance. As discussed above, the frequently used technologies may be specifically tailored for each converged device. Thus, using, for example, provisioning, real time configuration, adaptive learning, etc., the converged device may execute the frequently used functionalities with substantially dedicated device performance for the respective functionalities.

Those skilled in the art will understand that the above described exemplary embodiments may be implemented in any number of manners, including, as a separate software module, as a combination of hardware and software, etc. For example, the method 200 may be a program containing lines of code that, when compiled, may be executed on the processor 105.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method for adjusting a computing device, comprising:
receiving configuration data relating to at least two functionalities of the device, one of the at least two functionalities comprising a barcode reading functionality and the other of the least two functionalities comprising a radio frequency identification (RFID) functionality; and
adjusting configurations of components of the device as a function of the configuration data so that the device performs as if a first functionality of the at least two functionalities is a primary functionality of the device, the components being at least partially capable of performing the at least two functionalities.

2. The method of claim 1, further comprising:
before the receiving step, receiving initial configuration data to configure the components for the at least two functionalities.

3. The method of claim 2, wherein the configuration data one of adjusts and replaces the initial configuration data.

4. The method of claim 1, wherein the configuration data is provided manually to the device.

5. The method of claim 4, wherein the configuration data is manually provided using a configuration mechanism, the configuration mechanism being one of a software application programming interface, a static manufacturing configuration, a user interface, and a combination thereof.

6. The method of claim 1, wherein the configuration data is automatically generated by the device as a function of operating parameter data of the at least two functionalities.

7. The method of claim 6, wherein the automatic determination is performed one of (a) after a use of one of the at least two functionalities, (b) after a use of the device, (c) at predetermined time intervals, and (d) a combination thereof.

8. The method of claim 1, wherein the barcode reading functionality includes one of a scanning functionality and an image capture functionality.

9. The method of claim 1, further comprising:
adjusting a performance of a second functionality of the at least two functionalities to improve a performance of the first functionality.

10. The method of claim 9, wherein the first functionality has a priority for access to the components over the second functionality.

11. A computing device, comprising:
- a first module performing a barcode reading functionality, the barcode reading functionality being available through a use of at least one of a plurality of components of the computing device;
- a second module performing a radio frequency identification (RFID) functionality, the RFID functionality being available through a use of at least one of the plurality of components of the computing device; and
- a processor receiving configuration data relating to the barcode reading and RFID functionalities, the processor adjusting configurations of the plurality of components as a function of the configuration data so that the device performs as if one of the barcode reading functionality and the RFID functionality is a primary functionality of the device.

12. The device of claim 11, wherein the processor receives initial configuration data to configure the plurality of components for the barcode reading and RFID functionalities before receiving the configuration data.

13. The device of claim 12, wherein the processor one of adjusts and replaces the initial configuration data with the configuration data.

14. The device of claim 11, wherein the configuration data is provided manually to the device.

15. The device of claim 14, wherein the configuration data is manually provided using a configuration mechanism, the configuration mechanism being one of a software application programming interface, a static manufacturing configuration, a user interface, and a combination thereof.

16. The device of claim 11, wherein the processor automatically generates the configuration data as a function of operating parameter data of the barcode reading and RFID functionalities.

17. The device of claim 16, wherein the automatic determination is performed one of (a) after a use of one of the barcode reading and RFID functionalities, (b) after a use of the computing device, (c) at predetermined time intervals, and (d) a combination thereof.

18. The device of claim 11, wherein the barcode reading functionality includes one of a scanning functionality and an image capture functionality.

19. The method of claim 11, wherein a performance the RFID functionality is adjusted to improve a performance of the barcode reading functionality.

20. The device of claim 19, wherein the barcode reading functionality has a priority for access to the plurality of components over the RFID functionality.

21. The device of claim 11, further comprising:
- at least one third module performing a third functionality, the third functionality being available through a use of at least one of the plurality of components of the computing device.

* * * * *

UNITED STATES PATENT AND TRADEMARK OFFICE
CERTIFICATE OF CORRECTION

| | | |
|---|---|---|
| PATENT NO. | : 8,122,237 B2 | Page 1 of 1 |
| APPLICATION NO. | : 11/951906 | |
| DATED | : February 21, 2012 | |
| INVENTOR(S) | : Fuccello | |

It is certified that error appears in the above-identified patent and that said Letters Patent is hereby corrected as shown below:

In Column 6, Line 33, in Claim 1, delete "least" and insert -- at least --, therefor.

In Column 8, Line 18, in Claim 19, delete "method" and insert -- device --, therefor.

Signed and Sealed this
Eighteenth Day of December, 2012

David J. Kappos
*Director of the United States Patent and Trademark Office*